(12) United States Patent
Austin

(10) Patent No.: US 6,328,071 B1
(45) Date of Patent: Dec. 11, 2001

(54) WELL PRESSURE TANK

(76) Inventor: Cary Austin, 10221 CR 6900, Lubbock, TX (US) 79336

( * ) Notice: Subject to any disclaimer, the term of this patent is extended or adjusted under 35 U.S.C. 154(b) by 0 days.

(21) Appl. No.: 09/680,647

(22) Filed: Oct. 6, 2000

Related U.S. Application Data

(63) Continuation-in-part of application No. 09/542,312, filed on Apr. 4, 2000, now Pat. No. 6,276,658, which is a continuation-in-part of application No. 09/243,730, filed on Feb. 1, 1999, now Pat. No. 6,109,296, which is a continuation-in-part of application No. 08/886,905, filed on Jul. 2, 1997, now Pat. No. 5,988,984, which is a continuation-in-part of application No. 08/427,448, filed on Apr. 24, 1995, now abandoned, which is a continuation-in-part of application No. 08/103,340, filed on Aug. 6, 1993, now abandoned.

(60) Provisional application No. 60/159,869, filed on Oct. 12, 1999.

(51) Int. Cl.[7] .................................................. F16L 55/04
(52) U.S. Cl. ............................. 138/30; 138/26; 417/394
(58) Field of Search ........................ 138/26–31; 417/394, 417/479

(56) References Cited

U.S. PATENT DOCUMENTS

| | | | |
|---|---|---|---|
| 2,196,993 | 4/1940 | Kidder | 103/44 |
| 2,712,831 * | 7/1955 | Day | 136/26 |
| 2,961,966 | 11/1960 | Zillman et al. | 103/45 |
| 3,027,849 | 4/1962 | Zillman et al. | 103/228 |
| 3,370,544 * | 2/1968 | Thorpe, Sr. | 103/223 |
| 3,843,010 * | 10/1974 | Morse et al. | 138/30 X |
| 4,008,008 | 2/1977 | Vergnet | 417/385 |
| 4,257,751 | 3/1981 | Kofahl | 417/394 |
| 4,732,175 * | 3/1988 | Pareja | 138/30 |
| 4,810,172 | 3/1989 | Fiedler et al. | 417/394 |
| 4,936,383 * | 6/1990 | Towner et al. | 138/30 X |
| 4,974,674 | 12/1990 | Wells | 166/107 |
| 5,429,845 * | 7/1995 | Newhouse et al. | 138/30 X |

OTHER PUBLICATIONS

Product information sheet: 4 pages, Pressure–Master® Regulators, Senninger Irrigation Inc. 6416 Old Winter Garden Road, Orlando, FL 32835.

Weber Industries, Webtrol, Installation Instruction sheet, Tank–E–Liminators Dempster Industries Inc. AQUA–S–TOR, Beatrice, Nebraska, 68310.

* cited by examiner

*Primary Examiner*—Patrick Brinson
(74) *Attorney, Agent, or Firm*—Wendell Coffee

(57) ABSTRACT

A water system uses a pressure tank of an extremely small size. Said pressure tank is of extremely small diameter and can be a variety of lengths. This pressure tank has an opening at one end for fluid inlet and an opening on the opposite end for fluid outlet. This pressure tank is placed inside the well casing or inside the fluid reservoir to protect it from freezing and vandals as well as hidden from landscaping efforts. The pressure tank utilizes a flexible diaphragm to separate the air chamber from the fluid chamber. Said diaphragm to be open at both ends and tube shaped to allow installation in a small diameter housing to be used inside small diameter well casing.

6 Claims, 1 Drawing Sheet

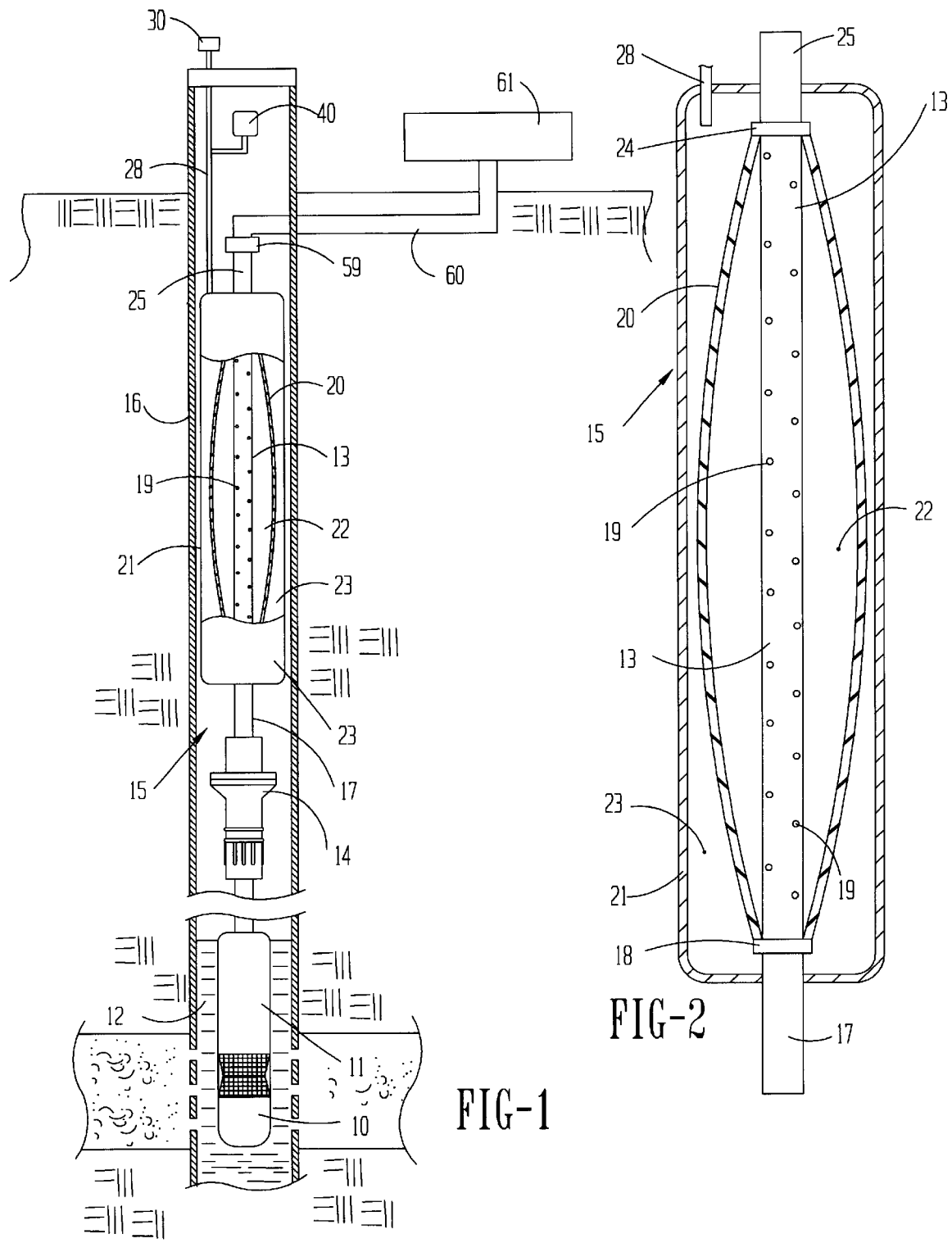

WELL PRESSURE TANK

CROSS REFERENCE TO RELATED APPLICATION

Provisional Patent Application

This application claims the benefit of U.S. Provisional Application No. 60/159,869, filed Oct. 12, 1999.

Non Provisional Patent Application

This is a continuation in part of my prior application on this subject matter filed Apr. 4, 2000, Ser. No. 09/542,312 now Pat. No. 6,276,658, which was a continuation in part of my application filed Feb. 1, 1999, Ser. No. 09/243,730 now Pat. No. 6,109,296 issued Aug. 29, 2000 which was a continuation in part of my application filed Jul. 2, 1997, Ser. No. 08/886,905 now Pat. No. 5,988,984 issued Nov. 23, 1999 which was a continuation in part of my application filed Apr. 24, 1995, Ser. No. 08/427,448 (now abandoned) which was a continuation in part of my application filed Aug. 6, 1993, Ser. No. 08/103,340 (now abandoned). Specific reference is made to the above documents.

BACKGROUND OF THE INVENTION (1) Field of the Invention

This invention relates to liquid systems and more particularly to a small storage vessel to allow for a relative small amount of liquid stored under pressure. This amount of stored liquid is to supply instant discharge from opening of a tap of a distribution system, and to allow for a measurable amount of liquid to be discharged from the system before requiring start up of the liquid supply pump. The system as a whole prevents the pump from cycling, that is quickly and repeatedly stopping and starting. Owners and Operators of water systems have ordinary skill in the art of this invention.

(2) Description of the Related Art

Many water pumps supply water to a system having irregular, intermediate use. Often these water pumps supply water into a reservoir such as a pressure tank. Water systems normally have a range of operating pressure. For example, the range of water pressure is set between 40 psi and 60 psi.

With small reservoirs the pressure drops quickly thus starting the pump motor. Then the reservoir is quickly filled and the pump motor stopped, resulting in the cycling condition.

Such a system as described is common on residential water systems having a separate water supply for every residence, as often occurs in rural areas. The problem could also exist in liquid systems other than water like gasoline fuel dispensing systems for example.

One solution to alleviate the cycling problem is to provide a large pressure reservoir. The reservoir stores a large amount of fluid to be used as the system pressure drops from 60 psi to 40 psi. In turn, as the pressure switch energizes the pump motor at 40 psi these large pressure tanks receive a large amount of fluid from the pump before the system is again filled to 60 psi and the pump is shut off. This allows for longer cycles with fewer starts and stops. These large pressure tanks are expensive, cumbersome, and maintenance intensive.

A second solution is to drive the pumps with a variable speed motor. As the pressure increases, the speed decreases by electrical control. By controlling the output flow from the pump to match the required usage, these devices eliminate cycling and almost eliminate the need for a pressure tank. In large systems enough taps are connected to require a constant flow from the supply. These new pump controls will keep the pump running continuously, supplying exactly the amount of flow being used. This eliminates the need for storing fluid in a pressure tank.

Another solution depends upon the fact that nearly all rotary pumps (non-positive displacement) have a reduced flow rate at high pressure. Therefore the system could be regulated to set a pressure cut off switch at a pressure slightly above the extreme reduced flow. However this might be far above the desired maximum pressure.

Yet another solution is to use an electric controlled valve to reduce the flow upon a signal produced by a high pressure in the system.

Perhaps a pump could be designed which had an adjustable flow rate at the same speed and a higher pressure. Such a pump might be developed by a pump having flexible blades.

Also pressure valves which at high pressure divert the flow to a by pass with a lesser flow rate.

The preferred solution is a pressure valve which reduces the flow at high pressure by forming a notch at the valve seat as described in my U.S. Pat. Nos. 5,988,984 and 6,109,296.

In smaller systems, zero flow is required at times when all of the taps are closed. Zero flow would require that the pump be off. If no fluid is stored under pressure as in a pressure tank, the slightest opening or drip from a tap would require restarting of the pump. Small bladder and diaphragm type pressure tanks are well known to the art. Such tanks are designed to express a small amount of fluid from an opened tap as pressure drops from 60 psi to 40 psi, and to receive a small amount of fluid as the pump fills the system from 40 psi to 60 psi. These small pressure tanks have a flexible membrane between the fluid in the tank and the air chamber. The air chamber is pre-charged to 38 psi creating a force that increases to 60 psi as the pump fills the fluid chamber until the pressure switch turns off the pump. The compressed air then forces fluid out of the fluid chamber as a tap is again opened. At 40 psi, just before the fluid chamber is emptied, the pump is again started.

Before this invention, the new pump controls greatly reduced the size of pressure tank required for a fluid delivery system. Still the small pressure tanks must be protected from freezing and vandalism. It is desirable that the tanks be hidden from beautified landscapes. Buried in the ground, hidden in the bushes, installed in crawl spaces, well houses, and vaults; even small tanks take up room.

SUMMARY OF THE INVENTION (1) Progressive Contribution to the Art

This invention solves the problems by installing the pressure tank inside the well casing. Secure from the elements and vandals, an in the well pressure tank leaves landscapes unmarked. Easily installed without digging or extra construction, this new pressure tank saves time, money, and space.

(2) Objects of the Invention

An object of this invention is to provide a pressure tank that will be non-obtrusive.

Another object of this invention is to provide a pressure tank with a outside diameter to fit inside well casing with a diameter as small as four inches.

Another object of this invention is to provide a pressure tank with a flexible membrane between the compressed air chamber and the fluid chamber.

Another object of this invention is to provide a pressure tank with said flexible membrane in a vertical position to allow fluid to enter one end of the fluid chamber and exit the opposite end of the fluid chamber.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 Is a schematic representation showing a liquid system according to this invention.

FIG. 2 Is an enlarged sectional view of a pressure tank according to this invention.

CATALOGUE OF ELEMENTS

As an aid to correlating the terms of the claims to the exemplary drawing(s), the following catalog of elements and steps is provided:
10 Motor
11 Pump
12 Water supply
13 Tube
14 Pump control valve
15 Pressure tank
16 Well casing
17 Pipe or tank inlet
18 Bottom clamp seal
19 Holes distribution
20 Flexible membrane
21 Tank body or Housing
22 Water chamber
23 Air chamber
24 Top clamp seal
25 Outlet pipe
28 Air line
30 Air inlet valve
40 Pressure switch
59 Connection (25 to 60)
60 Water line to
61 Distribution system

DESCRIPTION OF THE PREFERRED EMBODIMENT

A pressure tank 15 according to this invention is designed to be installed with a submersible motor 10 and pump 11 in the well casing 16. However a pressure tank according to this invention could be installed in any location.

The pressure tank 15 is basically a bladder or diaphragm type pressure tank which receives liquid on an increase of fluid pressure and express liquid on a decrease of fluid pressure. The tank is constructed in such a way that the tank easily fits inside small diameter well casing 16. Liquid enters through pressure tank inlet 17 at the bottom of the pressure tank 15 and is expressed out the top, allowing in-line flow from one end of the tank 15 to the other.

Referring to FIG. 1 there may be seen a schematic representation of water system according to this invention.

Pump 11 connected to motor 10 pumps liquid from a liquid supply which is usually a water supply 12 into a pipe 17. As pressure increases in the system, pressure switch 40 opens at a predetermined high pressure, 60 psi. As pressure switch 40 opens power is shut off (by an electric line not shown) to motor 10 stopping pump 11. Pump 11 having an integral check valve allows fluid to flow in an outward direction only. As a tap on water distribution system 61 is opened, compressed air chamber 23 presses against the flexible membrane 20. The air chamber 23 is charged with compressed air from air inlet valve 30 through air line 28. Forcing liquid to express through holes 19 to the outlet pipe 25 and the water line 60, supplying flow to the tap (not shown). As flow is released from the tap in the water distribution system 61, pressure drops from 60 psi to 40 psi, causing pressure switch 40 to close, starting the pump motor 10. Out put flow from the pump 11 being controlled by a pump control valve 14 supplies liquid to the open tap from water line 60 as required at 40 psi pump control. When the tap in water distribution system is closed, the pump 11 fills the liquid chamber 22 through the drilled holes 19 until the system pressure increases to 60 psi. At that pressure the pressure switch 40 opens, stopping the pump motor 10.

The control valve 14 is of great importance. Without the trickle flow as more fully described in my U.S. Pat. Nos. 6,109,296 and 5,988,984 a much larger pressure tank would be required. When the pressure in line 60 approaches the cut off pressure the control valve reduces the flow to a trickle flow which is the flow sufficient to prevent damage to the pump 11 and motor 10. With this delay the motor is not cut off as quickly. The extra time required at trickle flow is sufficient to prevent the rapid sequence of switching the motor on and off which damages the motor.

An example of valve 14 below the tank 15 in the casing 11 is a modified in-line valve manufactured by Senninger Irrigation, Inc. Orlando, Fla. 32811 named Pressure-Master® Regulator. The inlet, outlet, and internal liquid flow of the valve are all co-axial, making it an "in-line" valve. These valves are pressure regulating valves. That is they prohibit flow with an outlet pressure higher than a set value. The valve is modified by cutting a notch in the valve seating surface as shown as in the two prior patent noted above.

With this valve it may be seen that the water from the pump 11, through valve 14, inlet 17, tube 13, and outlet 25, is in a straight single "in-line" path. This "in-line" path results in minimum pressure drop as occurs in a multiple direction path. By multiple direction path is meant a pipe with elbows, tees, etc.

FIG. 1 shows the pressure tank 15 installed inside the well casing 16. The pressure switch 40 is installed on an air line 28 within the casing 16. It is desired that the pressure switch 40 (and pressure gauge if used) is attached to the air chamber 23 or air line 28. When the pressure switch is connected to a water container the switch is subjected to more undesirable contaminants or corrosive elements than when attached to an air container.

Not shown, a pressure transducer for a variable speed pump may be connected to the water line 60, or air chamber 23.

FIG. 2 shows an sectional view of the pressure tank 15. The fluid inlet 17 and the fluid outlet 25 are sealed to the pressure tank body or housing 21 at both ends of the pressure tank 15. It is noted that tube 13 is connected and sealed to the housing 21 between the holes 19 and the outlet pipe 25 and also connected and sealed to the housing 21 between the holes 19 and the inlet pipe 17.

The air chamber 23 is pre-charged with air through air inlet valve 30. The flexible membrane 20 separates the air chamber 23 from the fluid chamber 22, and is sealed to the fluid inlet pipe 17 with a bottom clamp seal 18, and to the fluid outlet pipe 25 with the top clamp seal 24. It is noted that the membrane 20 is sealed at 24 to the pipe 13 between the holes 19 and outlet 25. Also the bottom clamp is between the holes 19 and the inlet pipe 17. The holes 19 allow fluid to enter the fluid chamber 22 from the inlet pipe 17 on an increase of system pressure. Holes 19 also allow liquid to be expressed from the liquid chamber 22 into the fluid outlet pipe 25 on a decrease of system pressure. As the system pressure increases the flexible membrane 20 expands into the air chamber 23 allowing storage of fluid in fluid chamber 22. As system pressure decreases the compressed air chamber 23 forces the flexible membrane 20 to contact, expressing fluid through the drilled holes 19 to the fluid outlet pipe 25 which is connected to water line 60 by connection 59.

It will be noticed that the water flows from the pump 11 to the distribution line 60 is in a straight line, that is all the elements are co-axial. This in-line configuration is desirable or necessary to place the elements in the well casing 16. The in-line configuration also is desirable to reduce friction lost by continual straight line fluid flow.

The embodiments shown and described above is only exemplary. I do not claim to have invented all parts, elements or steps described. Various modifications can be made in the construction, material, arrangement, operation, and still be within the scope of my invention.

The restrictive description and drawings of the specific examples above do not point out What infringement of this patent would be, but are to enable one skilled in the art to make and use the invention. The limits of the invention and the bounds of the patent protection are measured by and defined in the following claims.

I claim as my invention:

1. A bladder pressure tank, including:
   a) a housing having a liquid inlet and outlet,
   b) the housing having an air chamber and liquid chamber separated by a flexible membrane,
   c) the air chamber is filled with compressed air and is pneumatically sealed to retain air within the chamber,
   d) said air chamber connected to a one way air fill valve outside the housing,
   e) the liquid chamber is filled with liquid,
wherein the improvement comprises:
   f) a tube having an axis extending through the liquid chamber,
   g) the tube connected to the liquid inlet outside the housing and the liquid outlet outside the housing,
   h) the tube inlet connected to a co-axial supply pipe carrying pressurized liquid from a pump and the tube outlet connected to a distribution pipe carrying liquid to a distribution area,
   i) the tube having a plurality of holes within the liquid chamber,
   j) the tube sealed to the housing between the inlet and holes,
   k) the tube sealed to the housing between the outlet and holes,
   l) a flow reducing valve connected to said liquid inlet,
   m) the flow reducing valve having a cylindrical outlet and an cylindrical inlet, and
   n) the valve inlet and the valve outlet co-axial with the tube.

2. A bladder pressure tank, including:
   a) a housing having a liquid inlet and outlet,
   b) the housing having an air chamber and liquid chamber separated by a flexible membrane,
   c) the air chamber is filled with compressed air and is pneumatically sealed to retain air within the chamber,
   d) said air chamber connected to a one way air fill valve outside the housing,
   e) the liquid chamber is filled with liquid,
wherein the improvement comprises:
   f) a tube having an axis extending through the liquid chamber,
   g) the tube connected to the liquid inlet outside the housing and the liquid outlet outside the housing,
   h) the tube inlet connected to a co-axial supply pipe carrying pressurized liquid from a pump and the tube outlet connected to a distribution pipe carrying liquid to a distribution area,
   i) the tube having a plurality of holes within the liquid chamber,
   j) the tube sealed to the housing between the inlet and holes, and
   k) the tube sealed to the housing between the outlet and holes, and
   l) a means pneumatically connected to the air chamber for measuring the pressure in the air chamber, and a switch means for stopping the pump responsive to measuring a high air pressure above a set amount, and for starting the pump responsive to measuring a low air pressure below a set amount.

3. The invention as defined in claim 2 further comprising:
   l) said pump having a pump inlet connected to a source of liquid,
   m) said pump pumping no more than 20% of the volume of liquid at the high pressure which activates said switch to stop the pump than the volume of liquid pumped at the low pressure which activates the switch to start the pump.

4. A method of supplying liquid from a relative low pressure at its source to a distribution system where the liquid has a relative high pressure and a irregular flow rate,
   a) pumping the liquid from the source to an intake of a control valve,
   b) flowing the liquid from an outlet of the control valve to liquid chamber in a pressure tank at all times when the pressure at the intake of the valve is greater than the pressure at the outlet of the valve,
   c) pressurizing the liquid in the liquid chamber by air pressure in an air chamber in the pressure tank,
   d) separating the air chamber and liquid chamber by a flexible impermeable membrane,
   e) flowing the liquid from the liquid chamber when the pressure in the air chamber is greater than the pressure in the distribution system,
   f) ceasing pumping liquid from the source when the pressure in the air chamber is higher than a pre set high pressure, and
   g) restarting pumping liquid from the source when the pressure in the air chamber is lower than a preset low pressure,
where in the improvement comprises:
   h) restricting the flow of liquid to a trickle flow from the control valve when pressure approaches the preset high pressure.

5. The invention as defined in claim 4 wherein the flow is restricted by the control valve.

6. The invention as defined in claim 5 where in the flow is restricted by closing the control valve except for a notch between valve seating surfaces.

* * * * *